(12) United States Patent
Cummins et al.

(10) Patent No.: US 11,593,127 B2
(45) Date of Patent: Feb. 28, 2023

(54) GENERATING A NAVIGABLE INTERFACE BASED ON SYSTEM-DETERMINED RELATIONSHIPS BETWEEN SETS OF CONTENT

(71) Applicant: Oracle International Corporation, Redwood Shores, CA (US)

(72) Inventors: Charles Eugene Cummins, Seattle, WA (US); Christian David Straub, Palo Alto, CA (US); Liza Lyons Broadbent, Middleburg, VA (US); Vladislav Oupický, Prague (CZ); Jan Peška, Slaný (CZ); Jan Plihal, Prague (CZ)

(73) Assignee: Oracle Interational Corporation, Redwood Shores, CA (US)

( * ) Notice: Subject to any disclaimer, the term of this patent is extended or adjusted under 35 U.S.C. 154(b) by 0 days.

(21) Appl. No.: 17/008,571

(22) Filed: Aug. 31, 2020

(65) Prior Publication Data
US 2021/0081222 A1 Mar. 18, 2021

Related U.S. Application Data

(60) Provisional application No. 62/900,619, filed on Sep. 15, 2019.

(51) Int. Cl.
*G06F 9/451* (2018.01)
*G06F 16/28* (2019.01)
*G06N 3/02* (2006.01)
*G06F 16/22* (2019.01)

(52) U.S. Cl.
CPC .......... *G06F 9/451* (2018.02); *G06F 16/2246* (2019.01); *G06F 16/288* (2019.01); *G06N 3/02* (2013.01)

(58) Field of Classification Search
CPC ....................................................... G06F 9/451
See application file for complete search history.

(56) References Cited

U.S. PATENT DOCUMENTS

2007/0162845 A1* 7/2007 Cave et al. ............. G06F 3/048
2011/0225548 A1* 9/2011 Callens et al. .......... G06F 3/048
2019/0114308 A1* 4/2019 Hancock ................. G06F 17/21

* cited by examiner

*Primary Examiner* — James J Debrow
(74) *Attorney, Agent, or Firm* — Invoke

(57) ABSTRACT

In one or more embodiments, a system generates a navigable interface for traversing sets of content based on system-determined relationships between the sets of content. The system uses a trained machine learning model to determine characteristics, such as layout, for sets of content. The characteristics are mapped to a content type. The system organizes the sets of content, based on respective content type, into a set of pages of a multipage navigable interface. Furthermore, the system selects navigational relationships between the sets of content based on respective content type. The navigational relationships are implemented via interface elements that allow for navigation between the pages of the navigable interface including corresponding sets of content.

22 Claims, 10 Drawing Sheets

GENERATING A NAVIGABLE INTERFACE BASED ON SYSTEM-DETERMINED RELATIONSHIPS BETWEEN SETS OF CONTENT

INCORPORATION BY REFERENCE; DISCLAIMER

The following application is hereby incorporated by reference: application No. 62/900,619 filed on Sep. 15, 2019. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to generating an interface for navigating through content. In particular, the present disclosure relates to generating an interface based on system-determined hierarchical relationships between sets of content.

BACKGROUND

When building an interface, many different factors are typically taken into consideration by a designer, such as what type of content appears on the various different pages of the interface, how the interface can be navigated, who will have access to the interface, etc. All of these various factors are taken into consideration when ultimately designing the interface so that a user can intuitively navigate through all of the information contained in the interface.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
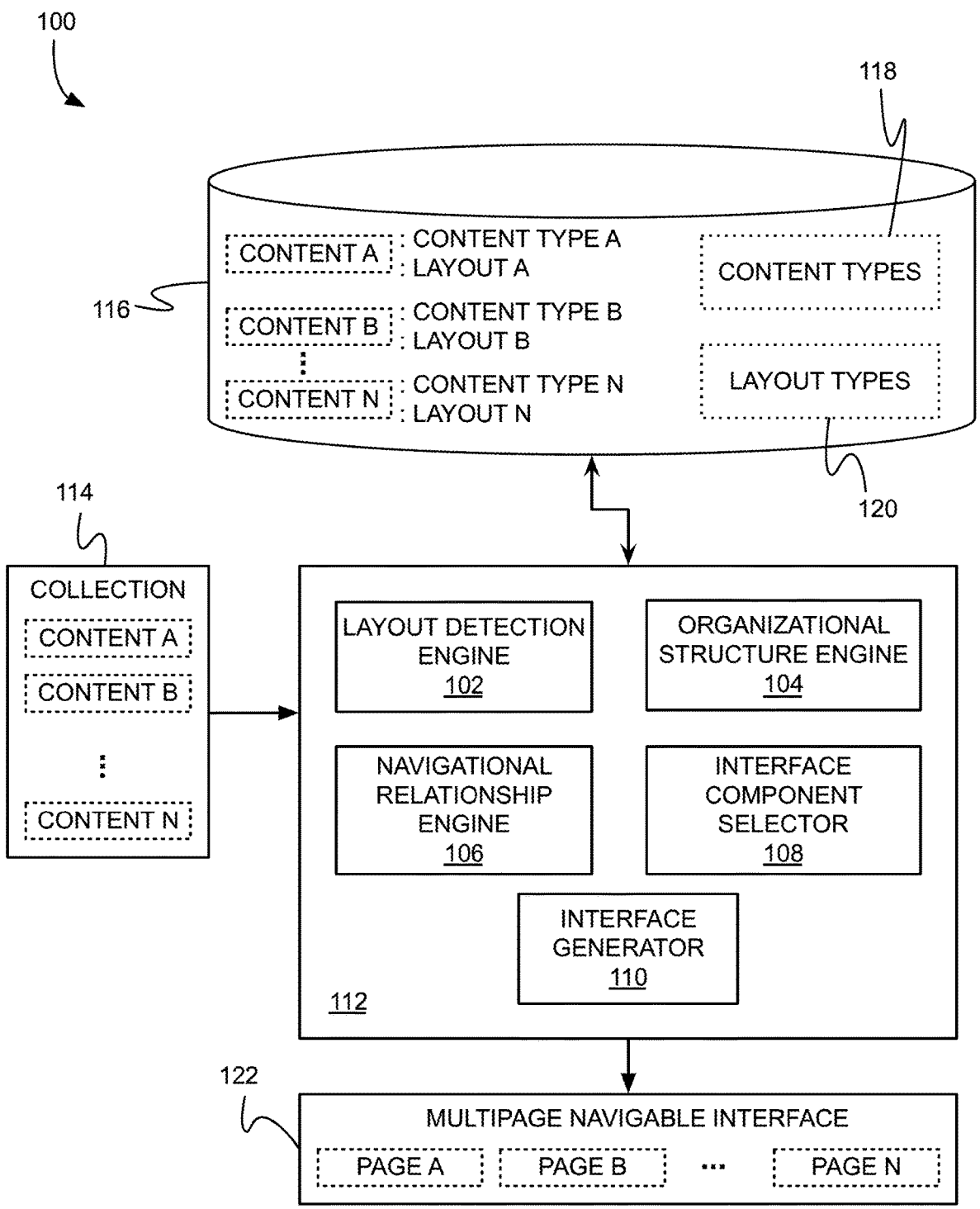
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM FOR GENERATING A MULTIPAGE NAVIGABLE INTERFACE
3. TRAINING A MACHINE LEARNING MODEL TO IDENTIFY ASPECTS OF SETS OF CONTENT
4. GENERATING A MULTIPAGE NAVIGABLE INTERFACE FROM SYSTEM-DETERMINED RELATIONSHIPS, LAYOUT, AND CONTENT TYPE
5. EXAMPLE EMBODIMENTS
   5.1 GENERATING AN EXAMPLE PAGE OF A MULTIPAGE NAVIGABLE INTERFACE
   5.2 EXAMPLE PAGE STRUCTURES
   5.3 RELATIONSHIPS BETWEEN A SERIES OF PAGES OF A MULTIPAGE NAVIGABLE INTERFACE
   5.4 EXAMPLE INTERFACE SHOWING RELATIONSHIPS BETWEEN PAGES OF A MULTIPAGE NAVIGABLE INTERFACE
6. COMPUTER NETWORKS AND CLOUD NETWORKS
7. MISCELLANEOUS; EXTENSIONS
8. HARDWARE OVERVIEW

1. General Overview

One or more embodiments generate a navigable interface for traversing sets of content based on system-determined relationships between the sets of content. The system uses a trained machine learning model to determine characteristics, such as layout, for sets of content. The characteristics are mapped to a content type. The system organizes the sets of content, based on respective content type, into a set of pages of a multipage navigable interface. Furthermore, the system selects navigational relationships between the sets of content based on respective content type. The navigational relationships are implemented via interface elements that allow for navigation between the pages of the navigable interface including corresponding sets of content.

Advantageously, embodiments generate a multipage navigable interface based on a submission that (a) includes sets of content and (b) does not necessarily include information on organizing the sets of content or navigating between the sets of content. The system-determined relationships between the sets of content allow for organizing and linking the sets of content in the multipage navigable interface without requiring that a user specify how the sets of content are to be organized or linked.

Advantageously, embodiments may be adapted to use new organizational structures for organizing and linking sets of content in a multipage navigable interface. Specifically, a machine learning model that computes suitable organization structures for organizing sets of content within pages of the multipage navigable interface may be trained to recognize new organizational structures. An organizational structure may be defined to include relationships (e.g., parent-child relationship, sibling relationship, or other relationship) between different content types.

One or more embodiments described in this Specification and/or recited in the claims may not be included in this General Overview section.

2. System for Generating a Multipage Navigable Interface

FIG. 1 illustrates a system 100 for generating a multipage navigable interface in accordance with one or more embodiments. The system 100 includes a machine learning (ML) engine 112 which includes a layout detection engine 102, an organizational structure engine 104, a navigational relationship engine 106, an interface component selector 108, and an interface generator 110. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The system 100 receives and/or obtains a collection 114 comprising sets of content, e.g., content A, content B, . . . content N, from which a multipage navigable interface 122 may be generated. The layout detection engine 102 analyzes the sets of content in the collection 114 to determine layout types and content types applicable to the sets of content. The organizational structure engine 104 is configured to determine an organizational structure to group together the various sets of content in the collection 114 for the multipage navigable interface 122. The navigational relationship engine 106 is configured to determine navigational relationships between pages in the determined organizational structure for the multipage navigable interface 122. The interface component selector 108 is configured to determine components to place in the various pages of the multipage navigable interface 122 for allowing for navigation between the various pages based on the determined navigational relationships. All of this information determined by the ML model may be used by the interface generator 110 to generate the multipage navigable interface 122.

Machine learning includes various techniques in the field of artificial intelligence that deal with computer-implemented, user-independent processes for solving problems that have variable inputs.

In some embodiments, the ML engine 112 trains a ML model to perform one or more operations. Training a ML model involves using training data to generate a function that, given one or more inputs to the ML model, computes a corresponding output. The output may correspond to a prediction based on prior machine learning. In an embodiment, the output includes a label, classification, and/or categorization assigned to the provided input(s). The ML model corresponds to a learned model for performing the desired operation(s) (e.g., labeling, classifying, and/or categorizing inputs). For example, the ML model may be used in determining a likelihood of a certain collection of content representing a certain page in an interface.

In an embodiment, the ML engine 112 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the ML engine 112 receives positive and/or negative reinforcement in the process of attempting to solve a particular problem (e.g., to optimize performance in a particular scenario, according to one or more predefined performance criteria). In an embodiment, the ML engine 112 initially uses supervised learning to train the ML model and then uses unsupervised learning to update the ML model on an ongoing basis.

In an embodiment, the ML engine 112 may use many different techniques to label, classify, and/or categorize inputs. The ML engine 112 may transform inputs into feature vectors that describe one or more properties ("features") of the inputs. The ML engine 112 may label, classify, and/or categorize the inputs based on the feature vectors. Alternatively or additionally, the ML engine 112 may use clustering (also referred to as cluster analysis) to identify commonalities in the inputs. The ML engine 112 may group (i.e., cluster) the inputs based on those commonalities. The ML engine 112 may use hierarchical clustering, k-means clustering, and/or another clustering method or combination thereof. In an embodiment, the ML engine 112 includes an artificial neural network. An artificial neural network includes multiple nodes (also referred to as artificial neurons) and edges between nodes. Edges may be associated with corresponding weights that represent the strengths of connections between nodes, which the ML engine 112 adjusts as machine learning proceeds. Alternatively or additionally, the ML engine 112 may include a support vector machine. A support vector machine represents inputs as vectors. The ML engine 112 may label, classify, and/or categorizes inputs based on the vectors. Alternatively or additionally, the ML engine 112 may use a naïve Bayes classifier to label, classify, and/or categorize inputs.

Alternatively or additionally, given a particular input, the ML engine 112 may apply a decision tree to predict an output for the given input. Alternatively or additionally, the ML engine 112 may apply fuzzy logic in situations where labeling, classifying, and/or categorizing an input among a fixed set of mutually exclusive options is impossible or impractical. The aforementioned ML model and techniques are discussed for exemplary purposes only and should not be construed as limiting one or more embodiments.

In an embodiment, as the ML engine 112 applies different inputs to a ML model, the corresponding outputs are not always accurate. As an example, the ML engine 112 may use supervised learning to train the ML model. After training the ML model, if a subsequent input is identical to an input that was included in labeled training data and the output is identical to the supervisory signal in the training data, then output is certain to be accurate. If an input is different from inputs that were included in labeled training data, then the ML engine 112 may generate a corresponding output that is inaccurate or of uncertain accuracy. In addition to producing a particular output for a given input, the ML engine 112 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

The multipage navigable interface 122 includes a plurality of pages, e.g., page A, page B, . . . , page N, organized according to a structure determined by the organizational structure engine 104. Each page of the multipage navigable interface 122 may include one or more interface components selected by the interface component selector 108 and may be linked via one or more navigational relationships determined by the navigational relationship engine 106 to one or more other pages within the multipage navigable interface 122.

In one or more embodiments, an interface may refer to hardware and/or software configured to facilitate communications between a user and a computing device. An interface renders user interface elements and receives input via user interface elements. Examples of an interface include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of an interface are specified in different languages. The behavior of user interface elements is specified in a dynamic programming language, such as JavaScript. The content of user interface elements may be specified in a markup language, such as hypertext markup language (HTML) or XML User Interface Language (XUL). The layout of user interface elements is specified in a style sheet language, such as Cascading Style Sheets (CSS). Alternatively, an interface may be specified in one or more other languages, such as Java, C, or C++.

Also, the system 100 may include a data repository 116 configured to store the sets of content of the collection 114 in conjunction with determined content type and layout, e.g., content A is stored in association with content type A and layout A, content B is stored in association with content type B and layout B, . . . , content N is stored in association with content type N and layout N. In addition, the system 100 may store content types 118 and layout types 120 in the data repository 116 that have been identified and/or provided to the ML model, for use in identifying these aspects of collections of content.

In one or more embodiments, the data repository 116 may be used to store information for system 100, and may be any type of storage unit and/or device (e.g., a file system, database, collection of tables, or any other storage mechanism) for storing data. Further, the data repository 116 may include multiple different storage units and/or devices. The multiple different storage units and/or devices may or may not be of the same type or located at the same physical site. Further, the data repository 116 may be implemented or may execute on the same computing system as the system 100. Alternatively or additionally, the data repository 116 may be implemented or executed on a computing system separate from system 100. The data repository 116 may be communicatively coupled to any device for transmission and receipt of data via a direct connection or via a network.

Additional embodiments and/or examples relating to computer networks which may be used to receive and/or transmit information for system 100 are described below in Section 6, titled "Computer Networks and Cloud Networks."

In an embodiment, system 100 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

Examples of operations for generating a multipage navigable interface from system-determined content, layout, and relationships are described below with reference to FIGS. 2-3.

3. Training a Machine Learning Model to Identify Aspects of Sets of Content

Figure 2:
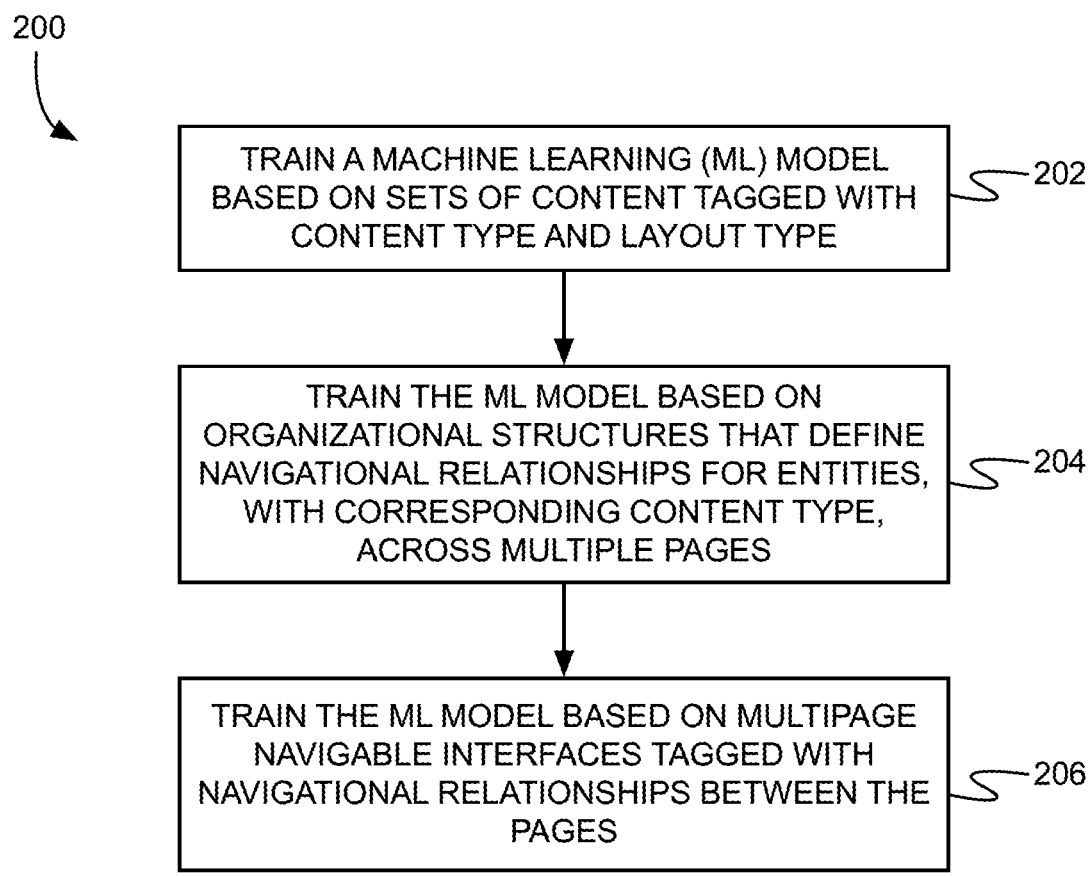
FIG. 2 illustrates an example method for training a machine learning model in accordance with one or more embodiments.
Figure 3:
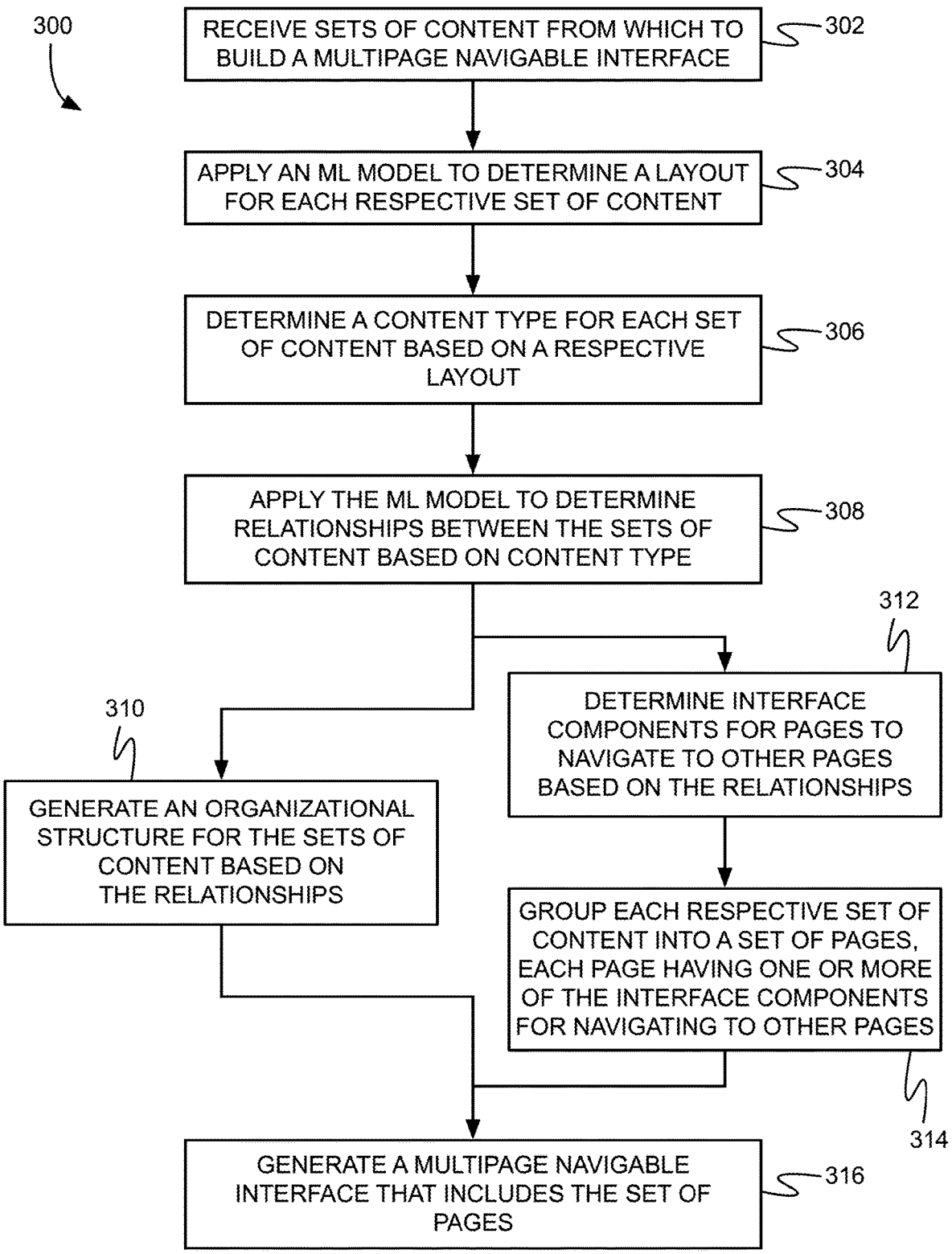
FIG. 3 illustrates an example method for generating a multipage navigable interface in accordance with one or more embodiments.

FIG. 2 illustrates an example method 200 for training a machine learning (ML) model in accordance with one or more embodiments. Method 200, in one embodiment, may be performed by at least one hardware device that includes a hardware processor. One or more operations illustrated in FIG. 2 may be modified, rearranged, or omitted all together. Accordingly, the particular sequence of operations illustrated in FIG. 2 should not be construed as limiting the scope of one or more embodiments.

In operation 202, a system trains the ML model based on sets of content tagged with content type and layout type. The ML model analyzes the sets of content to determine different content types, with each different content type being tagged for a corresponding set of content. Some example content types include, but are not limited to, webpages, images, videos, help pages, index pages, root sites, main entry sites, database sheets, catalog pages, product description pages, event description pages, word-processing documents, etc.

The ML model also analyzes the sets of content to determine different layout elements, with each different layout element being tagged within a corresponding set of content. Some example layout elements include, but are not limited to, a list, a title, a description section, a sidebar, a pull-down menu, a pop-up notification, a headline, an embedded media element (an image, audio, and/or video), a search bar, a table, a spreadsheet, etc. Multiple different layout elements may be identified from a single set of content.

In some cases, one or more identified layout elements may be combined into a recognizable combination that indicates the presence of a particular layout type. In other words, each layout type may be defined by one or more corresponding combinations of layout elements to further determine an overall layout for a set of content. As an example, a root page layout may be defined as a combination of a title layout element and a list layout element. If a set of content includes (a) content that matches the formatting or style of a title layout element, and (b) content that matches the formatting or style of a list layout element, then the set of content may be classified as having a root page layout.

In another example, a detail page layout may be defined as a combination of a headline layout element, an embedded media layout element, and a description section layout element. If a set of content includes (a) content that matches the formatting or style of a headline layout element, (b) embedded media content (image, video, audio) related to the headline that is defined to be presented in an embedded media layout element, and (c) content that matches the formatting or style of a description section layout element related to the headline, then the set of content may be classified as having a detail page layout.

In yet another example, a database page layout may be defined as a combination of a title layout element and a tabular layout element related to the title. If a set of content includes (a) content that matches the formatting or style of a title layout element, and (b) content that matches the formatting or style of a tabular layout element that relates to the title, then the set of content may be classified as having a database page layout.

The ML model is configured to identify a content type and a layout type for a particular set of content when it is present in the particular set of content based on one or more aspects of the particular set of content and the learned content types that the ML model has been trained on during the training process.

For example, webpage content type may be identified due to HTML or some other common mark-up language being used to code the content. In another example, image content type may be identified due to a format of the file, e.g., .jpg, .png, .gif, .bmp, etc. According to another example, root site content type may be identified due to relationships between the data represented by the root site, the relationships providing for interconnections between the root site and other pages represented by other sets of content.

In operation 204, the system trains the ML model based on organizational structures that define navigational relationships for entities, with corresponding content type, across multiple pages. Each organizational structure may include one or more pages, with each page displaying and/or conveying content of a particular type in a certain layout. The ML model learns patterns for distinguishing between different organizational structures by being exposed to many different structures tagged with navigational relationships for the entities represented by the interface.

In an example, the system may train the ML model on hierarchical or tree structures, where every entity in the organization, except one (the highest entity in the structure), is subordinate to a single other entity. In this way, when sets of content that fit in a hierarchical structure are provided to the ML model in the future, the ML model is able to recognize this ability to be organized in a hierarchical structure and group the sets of content appropriately to form the hierarchical structure.

In another example, the system may train the ML model on flat structures, where every entity in the organization is on the same level with every other entity. In this way, when sets of content that fit in a flat structure are provided to the ML model in the future, the ML model is able to recognize this ability to be organized in a flat structure and group the sets of content appropriately to form the flat structure.

In yet another example, the system may train the ML model on heterarchical structures, where the entities in the organization are unranked (non-hierarchical) or where they possess a potential to be ranked a number of different ways. In this way, when sets of content that fit in a heterarchical structure are provided to the ML model in the future, the ML model is able to recognize this ability to be organized in a heterarchical structure and group the sets of content appropriately to form the heterarchical structure.

In operation 206, the system trains the ML model based on multipage navigable interfaces tagged with navigational relationships between the pages of the interfaces. Each interface includes a plurality of pages, and certain pages within an interface may have navigational relationships to other pages in the interface. These navigational relationships between the pages of the interface are tagged to allow the ML model to learn a variety of different navigational relationships that are possible between different pages in different interfaces.

Various types of navigational relationships may be present in the multipage navigable interfaces that the system trains the ML model based on which may be recognized in future sets of content by the ML model. As the ML model identifies more and more relationships between groups of content, then an organizational structure may be formed that provides for the identified relationships and elements may be placed on pages of the interface to allow for navigation between the various pages, where appropriate.

According to one embodiment, the multipage navigable interfaces may be tagged with information regarding the aspect ratio and/or format of the interface, specifically indicating what kind of device the interface has been designed to be displayed on. Different types of devices include, but are not limited to, desktop computers, laptop computers, smartphones, tablet computers, media devices like set top boxes and streaming devices, televisions and monitors, smart TVs, wearable devices like smartwatches, etc. Each of these devices will have a different set of characteristics for which an interface should adhere, e.g., aspect ratio, size of the interface (as measured by pixel height and pixel width, linear measurements of height and width), and available user input devices (touchscreen, mouse, keyboard, virtual keyboard, voice input, gestures, etc.).

For example, a multipage navigable interface configured to be displayed on a smartphone may be designed with an aspect ratio that fits within a screen size of the smartphone, e.g., the aspect ratio and size (height and width) of the interface may be set to correspond with the aspect ratio and size of the smartphone's touchscreen display. Moreover, the various interface elements included in this interface may be positioned and/or selected to accommodate the limited screen size of the smartphone and respond to touch input via the touchscreen display rather than mouse or keyboard entry. In an example, a list of products for purchase on an ecommerce site may be presented in a single column when displayed in an interface shown on a smartphone. This allows the information for each product (e.g., image, price, dimensions, etc.) to be more easily accessed by a user of the smartphone, as the user can scroll up or down to access all of the various products available for purchase easily on the smartphone with an up or down swipe gesture. It is more cumbersome and less common for a user to be required to swipe left or right on a smartphone to move through an interface, and therefore the interface would be configured to fill a height and width of the smartphone touchscreen, but not scroll right or left.

In contrast, a multipage navigable interface configured to be displayed on a desktop computer may be designed to be scrollable, and therefore the aspect ratio and size of the interface may be adjustable by the user and not specifically align with a screen size of a monitor for the desktop computer, e.g., it may be smaller or larger than the screen size and able to be enlarged or reduced in size via user input. Moreover, the various interface elements included in this interface may be positioned and/or selected to allow easier user access without strict consideration of the size of the interface and respond to mouse and keyboard entry rather than touch input (when the monitor is not a touchscreen). In an example, a list of products for purchase on a shopping page may be presented in multiple columns which may be expanded, shrunk, increased in number, and decreased in number in order to fill the width of the interface as presently displayed on the monitor for the desktop computer. Since the monitor for the desktop computer is larger in size than the touchscreen of the smartphone, more information may be displayed on the screen of the desktop monitor at the same time as compared to the smartphone touchscreen. As the user expands or shrinks window or tab which displays the interface on the desktop monitor, the columns will automatically be expanded, shrunk, increased in number, or decreased in number to respond to the new size of the interface and maximize use of the interface for ease of use by the user.

The ML engine utilizes these device-specific interfaces that are tagged with information detailing what type of device they are intended to be displayed on to train the ML model on a variety of different devices available for display of interfaces, and how the interface should be configured to accommodate the different characteristics of the devices. In this way, the ML model may be used to generate device-appropriate multipage navigable interfaces that are usable for navigating through various sets of content.

4. Generating a Multipage Navigable Interface from System-Determined Relationships, Layout, and Content Type FIG. 3 illustrates an example method for generating a multipage navigable interface in accordance with one or more embodiments. Method 300, in one embodiment, may be performed by at least one hardware device that includes a hardware processor, referred to as a system. One or more operations illustrated in FIG. 3 may be modified, rearranged, or omitted all together. Accordingly, the particular sequence of operations illustrated in FIG. 3 should not be construed as limiting the scope of one or more embodiments.

In operation 302, the system receives sets of content. The sets of content may include images, videos, text, metadata, etc., which may be analyzed by the system in order to determine an organized structure to place the various content. The system is configured to build a multipage navigable interface based on the received sets of content. In one approach, the system may store the sets of content in a data repository. The data repository may be accessed by the system to retrieve the stored content, as needed, while analyzing the sets of content and making determinations as to possible configurations, layouts, and elements to organize the sets of content.

The sets of content may be received from an application operating on the system. The application may be configured to assemble the multipage navigable interface by collecting the content from various sources, any of which may be specified by a user, generated by the application, imported to the application from one or more other applications or processes, etc.

In one embodiment, the system may obtain the sets of content from a remote server (e.g., a cloud server) that stores sets of content uploaded by one or more users. In another embodiment, the system may obtain the sets of content from a web application that provides for user uploads of content.

In operation 304, the system analyzes the sets of content to determine a layout for each respective set of content. This analysis may be aided by applying an ML model to the sets of content, with the ML model having been trained on various layout types and data sets as described in more detail in FIG. 2. In analyzing a particular set of content, the system identifies entities and elements within the set of content that may be indicative of the layout.

As an example, the system may identify a set of lines, each line being preceded by a number. In another example, the system may identify a text file which includes a description. In an example, the system may identify a table populated with data. In one example, the system may identify a field configured to trigger a search through one or more sets of content for an entered value. According to another embodiment, the system may identify an image file.

The system may identify aspects and/or characteristics of the entities to determine if the entities are indicative of a layout element. For example, the set of lines preceded by a number may be determined to correspond to a list layout element, the text file may be determined to correspond to a description layout element for a description page, the search field may be determined to correspond to a search bar layout element for inclusion on an index page, and the image file may be determined to correspond to a product image layout element for a description page.

Once various layout elements are identified, a layout type may be determined by recognizing correlations of the various layout elements. For example, identification of a title layout element to be displayed in conjunction with a list layout element may indicate a root page layout. In another example, identification of a text file to be displayed in conjunction with an image file may indicate a description page for content common to both elements. In an example, identification of a search bar may indicate an index page.

Referring again to FIG. 3, in operation 306, the system analyzes the sets of content to determine a content type for each respective set of content based at least on the determined layout for each respective set of content. Determination of the content type may be aided by applying the ML model to the determined layout for each respective set of content, with the ML model having been trained on various different content types and corresponding layout types, as described in more detail in FIG. 2.

According to one embodiment, metadata that describes each respective set of content may be obtained by the system. In this embodiment, the system may determine a content type for each particular set of content in the collection based on the content metadata corresponding to the particular set of content. Many different types of content are possible, depending on the type of interface, type of collection, and purported uses thereof. Some example content types include, but are not limited to, webpages, images, videos, help pages, index pages, root or main entry site, database sheets, catalog pages, product or event description pages, individual documents, etc.

In various embodiments, the content metadata may include, but is not limited to, a number of images within a corresponding set of content, a size of text within the corresponding set of content, whether the corresponding set of content is related to payment processing, a number of fields within the corresponding set of content, a type of the fields within the corresponding set of content, etc.

According to one or more embodiments, the content type for a particular set of content in the collection may be determined by computing a similarity score for the particular set of content. The similarity score may be computed by comparing the content characteristics of elements within the particular set of content with a standard set of characteristics for a particular learned content type. In this embodiment, each type of content may have a standard set of characteristics determined by the system for comparison purposes. The similarity score may be normalized to a certain scale, such as −1.0 to 1.0, 0 to 1, 0 to 10, 0 to 100, etc., with a most similar set being at one extreme of the scale, and a least similar set being at the other end of the scale.

In one example, the similarity score may represent a percentage of similar elements within the set of content compared to the standard set, which may be weighted such that most important elements provide greater influence on the similarity score compared to less important elements. Importance of elements may be determined by the system based on any factor, such as frequency of inclusion in learned sets of content, user input, etc.

In an example, each dissimilar element in a set of content may subtract from an initial similarity score to determine the resulting similarity score for the set of content being analyzed in comparison with the standard set representative of a particular type of content.

Referring again to FIG. 3, in operation 308, the system analyzes the sets of content to determine relationships between the sets of content based at least on the content type for each respective set of content. Determination of the relationships between the sets of content may be aided by applying the ML model to the sets of content, with the ML model having been trained on various relationship types and organizational structures that include relationships between pages thereof, as described in more detail in FIG. 2.

Navigational relationships include links, forwards, returns, and connections between pairs of sets of content within the collection. For example, a root page may include a link to an index page, while the index page may include links to each page available in the interface. In another example, a help page may be accessible from each page in the interface, but the help page may not link back to any of the pages, except the page from which it was accessed. Some example link types include unidirectional links, bi-directional links, jumps that skip one or more sets of content, etc.

As an example, if the ML model determines one or more similarities between a webpage content type and an index page content type, such as a textual headline common to both content types, the ML model will determine a one-to-one relationship between the webpage content type and the index page content type. In another example, if the ML model determines that headlines on a plurality of other webpages also appear in a list on the index page, the ML model will determine a one-to-many relationship between the index page content type and the plurality of webpage content types.

If the system detects an image content type of an object from a first angle and an image content type of the same object from a different angle, the system records a relationship between the pair of sets of content as related images of the object.

In another example, if the system detects a webpage that includes "contact us" content type which is accessible from a root page, a relationship between the contact us page and the root page is determined. However, the system does not determine that relationships exist between the contact us page and other product pages.

In yet another example, if the system detects a webpage that includes help content type which is accessible from a plurality of webpages, a one-to-many relationship between the help page and all of the plurality of webpages is determined.

Referring again to FIG. 3, in operation 310, the system determines an organizational structure for the sets of content based at least on the determined relationships. The organizational structure may be determined by the system by applying the ML model to the organizational structure, layouts, and content types, with the ML model having been trained on a plurality of different organizational structures that include relationships between pages thereof, as described in more detail in FIG. 2.

The organizational structure for the collection may be determined or inferred based on the content type for each particular set of content in the collection, among other possible sources of information useful for determining the organizational structure. Some example organizational structures include, but are not limited to, multi-node graph structures with or without a central node, a tree and leaf structure, a single-level flat structure, a divisional structure, a functional top-down hierarchy structure, a matrix structure, etc.

Once the plurality of navigational relationships between the individual sets of content in the collection are determined, the organizational structure of the collection may be inferred from the set of relationships. In this embodiment, the individual sets of content within the collection may be compared to learned types of content to determine an organizational structure that provides placement for all the different types of content.

For example, if the relationships between the nodes of the structure support a decision that the organizational structure is a multi-node structure, then the system may determine the structure as being a multi-node structure having the determined relationships with each page of content arranged in the multi-node structure appropriately according to its individual content type. In another example, if the system determines that a root set of content is in the collection, then the system may determine that the organizational structure is a functional top-down hierarchy structure, and additional relationships may be determined between the various levels of the hierarchy structure.

In one embodiment, the system may determine that a first set of content is the only set of content of its kind in the collection. The system may also determine that multiple sets of content in the collection are of a second content type different from the first set of content. In this embodiment, the system may generate a hierarchical structure having a first node representing the first set of content and multiple nodes respectively representing the multiple sets of content. The first node is a parent node of each of the multiple nodes, and many different branches of the hierarchical structure may be determined by the system in an iterative process.

In a further embodiment, the system may determine that the first node is linked to the multiple nodes in accordance with multiple first navigational relationships. The system may also determine that the first page comprises multiple interface elements corresponding respectively to multiple navigational relationships that provide for navigation from the first page to other pages generated for the multiple nodes of the second content type.

In an embodiment, the system may determine a device type for display of the multipage navigable interface based on layouts for the sets of content. The device type for display of the interface may be any type of device, such as a laptop, desktop computer, tablet, smartwatch, smartphone, etc. Each of these device types may have different characteristics that dictate how the interface should be designed and a format for presentation of the interface. may be based on the layout for the first set of content and the second layout for the second set of content, and wherein the multipage navigable interface is configured for operation on the determined device type.

Referring again to FIG. 3, in operation 312 which may be performed concurrently with operation 310, the system determines interface components for pages of an interface, the interface components being operable to navigate to other pages of the interface based on the determined relationships.

Example interface components include, but are not limited to, links, radio buttons, menus, pull-down menus, navigation bars, text-input fields, graphics, etc.

In operation 314, which may be performed concurrently to operation 310, the system groups together each respective set of content into a set of pages (which may include one or more pages for each set of content). Each page includes one or more of the interface components generated in operation 312 for navigating to other pages of the interface.

In operation 316, the system generates a multipage navigable interface comprising the pages of content created in operation 314 and organized according to the structure determined in operation 310. The multipage navigable interface may have any number of pages, each page may have any layout and may display any portion of the sets of content as determined by the ML model during generation of the interface. Moreover, the pages of the interface may be organized according to any structure and may include any number of interface components located on any of the various pages, including on a single page, as determined by the ML model during generation of the interface.

In one embodiment, the multipage navigable interface may include all system-determined navigational relationships between the individual sets of content within the collection. Moreover, each set of content may be accessible through the multipage navigable interface for display based on the determined relationship(s) with other sets of content within the collection. In addition, each set of content may be displayed through the multipage navigable interface on one or more pages thereof, with display properties and capabilities of the system presenting the multipage navigable interface being considered when generating the interface. For example, some interfaces and sets of content may be tailored for certain display types, such as on smartphones, computer monitors, televisions, etc.

In an embodiment, the system may generate the multipage navigable interface to have a specific format for display on one or more types of devices. For example, the interface may be configured for display on desktop computers, on smartphone touchscreens, on smartwatches, etc. Each of these different device types may influence what interface elements are included, and how the selected interface elements are arranged and displayed in the interface. These considerations are intended to allow a user to access the sets of content that are included in the interface more easily from whatever type of device is being used to display the particular interface.

5. Example Embodiments

Detailed examples are described below for purposes of clarity. Components and/or operations described below should be understood as one specific example which may not be applicable to certain embodiments. Accordingly, components and/or operations described below should not be construed as limiting the scope of any of the claims.

Moreover, the various example pages described below are designed to be included in an online commerce site for furniture. However, the multipage navigable interface may be directed to any type of user interface, and is not limited to an online commerce site for furniture. Other example multipage navigable interfaces may be directed to any content type and purpose. For example, news and media presentation, online streaming services for music and/or videos, online shopping, online banking, financial transactions and records presentation, application and operating system download and update services, etc.

5.1 Generating an Example Page of a Multipage Navigable Interface

Figure 4A:
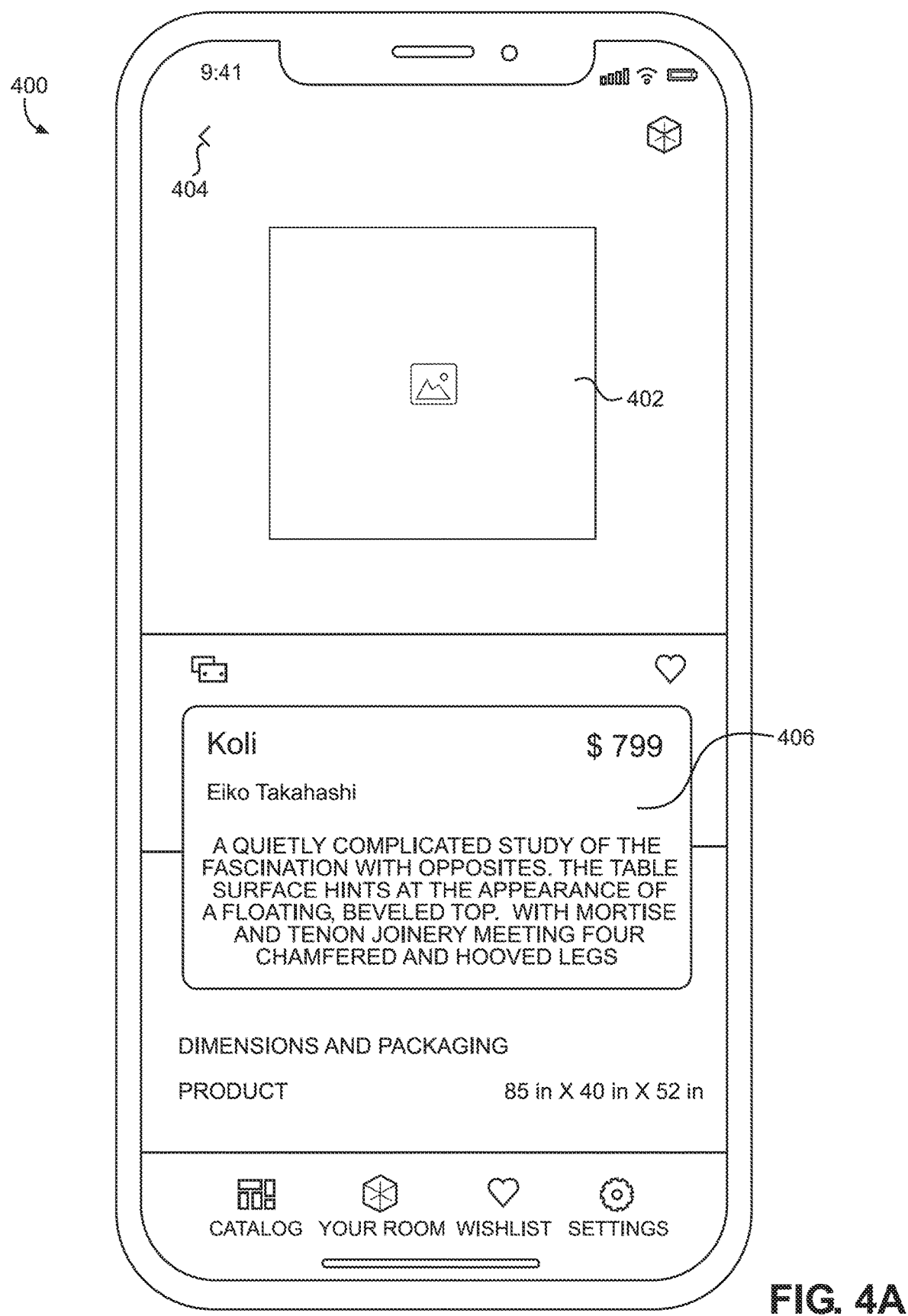
FIGS. 4A-4B illustrate generation of an example page of a multipage navigable interface in accordance with one or more embodiments.
Figure 4B:
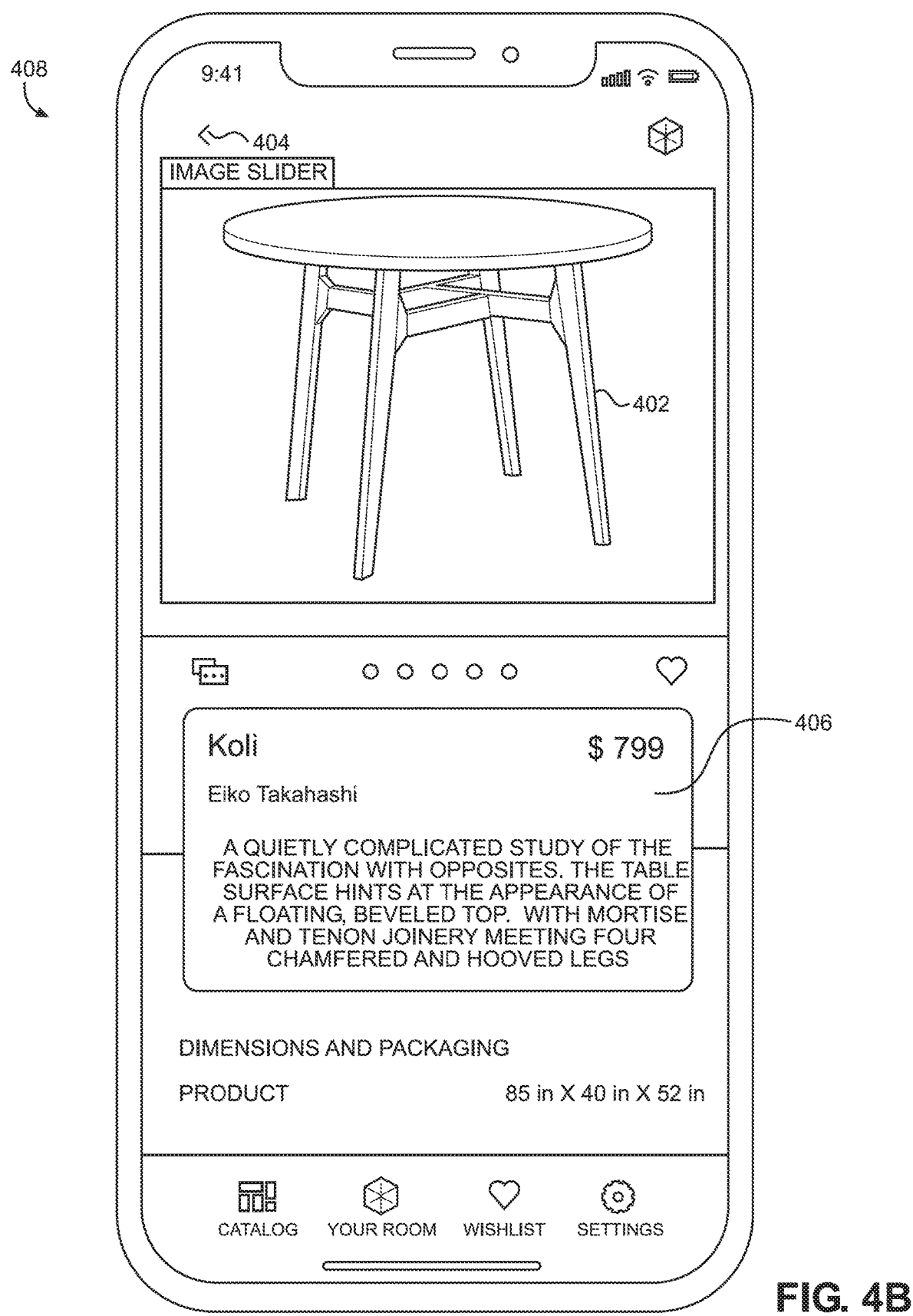

FIGS. 4A-4B illustrate generation of an example page of a multipage navigable interface in accordance with one or more embodiments. Each page of the multipage navigable interface may be generated from a set of content that is determined to be related by the system.

FIG. 4A shows an unfinished example product detail page 400 in accordance with one embodiment. Although certain components are shown on the product detail page 400, any combination and placement of components may be used to assemble a product detail page in various approaches. The set of content that is used to generate the product detail page 400 may include a description of the product, an image of the product, dimensions of the product, etc. As shown, the product detail page 400 includes an image interface element 402 for placing and displaying an image, a navigation interface element 404 that corresponds to a navigational relationship to another page, and a description interface element 406 for displaying a description of the product. In this example, the product is "Koli," a table with a "floating, beveled top" that retails for a price of $799. Below the description element 406 there is additional information about the product which may be scrolled to, including dimensions and packaging information.

FIG. 4B shows the example product detail page 408 with the image in place in accordance with one embodiment. As shown, the product detail page 408 includes the image interface element 402 with an image of the "Koli" table in place. The other interface elements are the same from the unfinished product detail page 400 of FIG. 4A. Referring again to FIG. 4B, the product detail page 408 may be stored to a data repository for use in a multipage navigable interface that includes a plurality of product detail pages, each describing a different product, in one approach.

In an example, if a system receives the example product detail page 408 for inclusion in a multipage navigable interface, the system may determine that inclusion of the image 402 depicting the "Koli" table and the description 406 of the "Koli" table indicates that this page is a product detail page for the "Koli" table. Based on this determination, the system may infer a relationship to a catalog page, where the catalog page includes links to all product detail pages. As a result, the system places a navigation interface element 404 on the "Koli" product detail page 408 that, when selected, transitions the interface to the catalog page according to this determined relationship.

Moreover, common interface elements may be placed on each page of the interface, such as in a ribbon appearing in the same place on each page. In one example, a ribbon positioned on the bottom of each page may include an interface element for transitioning to the catalog page (e.g., the "Catalog" link), an interface element for accessing a list of products that a user has expressed interest in (e.g., the "Wishlist" link), an interface element for transitioning to an augmented reality (AR) page (e.g., the "Your Room" link), and an interface element for transitioning to a configuration page (e.g., the "Settings" link).

In one embodiment, additional and/or different content and types of pages may be included in the multipage navigable interface, as the pages of the interface are not limited to product detail pages, Catalog pages, Wishlist pages, AR pages, and Settings pages.

5.2 Example Page Structures

Figure 5:
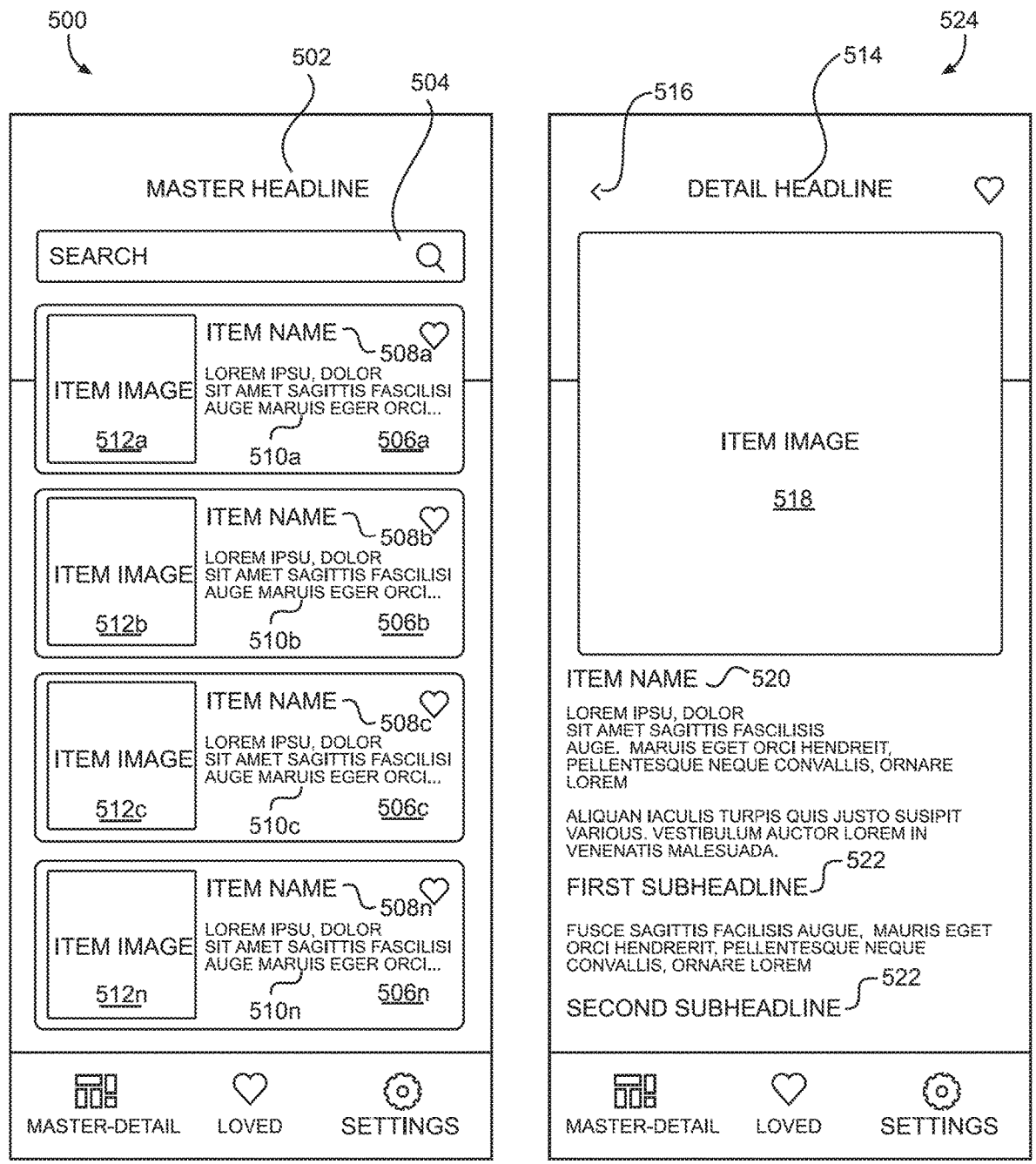
FIG. 5 illustrates example pages of a multipage navigable interface in accordance with one or more embodiments.

FIG. 5 illustrates example pages of a multipage navigable interface in accordance with one or more embodiments. An example catalog page 500 includes a master headline interface element 502 for displaying a title for the collection, a search bar interface element 504 for searching through the collection of content in the multipage navigable interface. A series of product detail pages are described with summary panes 506a, 506b, . . . 506n. Each summary pane 506a, 506*b*, ... 506*n* includes an item name interface element 508*a*, 508*b*, ... 508*n* for displaying a name of the product, a description interface element 510*a*, 510*b*, ... 510*n* for storing a brief description of the product, and an item image interface element 512*a*, 512*b*, ... 512*n* for displaying a small image of the product. More, less, and/or different content may be included in any of the summary panes 506 in several embodiments. In addition, more, less, and/or different summary panes 506 may be included in the catalog page 500 in several embodiments. The catalog page 500, after it is populated with desired content, may be stored to a repository for use in a multipage navigable interface in an embodiment.

In an example, if the system receives the catalog page 500 for inclusion in a multipage navigable interface, the system may determine that inclusion of the search bar 504 and product summary panes 506*a*, 506*b*, ... 506*n*, indicates that this page is a catalog page for various products. Based on this determination, the system may infer a relationship from the catalog page 500 to the product detail pages via the product summary panes 506*a*, 506*b*, ... 506*n*. As a result, the system places navigation interface elements for each product summary pane that, when selected, transitions the interface to the appropriate product detail page according to these determined relationships.

An example detail page 524 includes a detail headline interface element 514 for displaying a name for the page, a navigation interface element 516 for returning to a previously viewed page (such as the catalog page 500) in the multipage navigable interface. The detail page 524 includes an image interface element 518 for placing an image of an item, a name interface element 520 for displaying the name of the item and a corresponding description, and a series of subheadline interface elements 522 with corresponding descriptions. More, less, and/or different content may be included in the detail page 524 in several embodiments. The detail page 524, after it is populated with desired content, may be stored to a repository for use in a multipage navigable interface in an embodiment.

In an example, if a system receives the example detail page 524 for inclusion in a multipage navigable interface, the system may determine that inclusion of an image interface element 518 related to a description of a related item that includes a name 520 and a corresponding description indicates that this page is a detail page for the item. Based on this determination, the system may infer a relationship from this detail page 524 to the catalog page 500, where the catalog page 500 includes a summary pane of the item represented by the detail page 524. As a result, the system places a navigation interface element 516 on the detail page 524 that, when selected, transitions the interface from the detail page 524 to the catalog page 500 according to this determined relationship.

The catalog page 500 may provide for navigation to any of the detail pages, with each detail page being accessible via input (e.g., clicking with a mouse, tapping on a touchscreen, selecting with a keyboard, etc.) on a corresponding one of the summary panes. Each detail page 524 includes a navigation interface element 516 for returning to the catalog page 500 to access other detail pages and/or other content.

Figure 6:
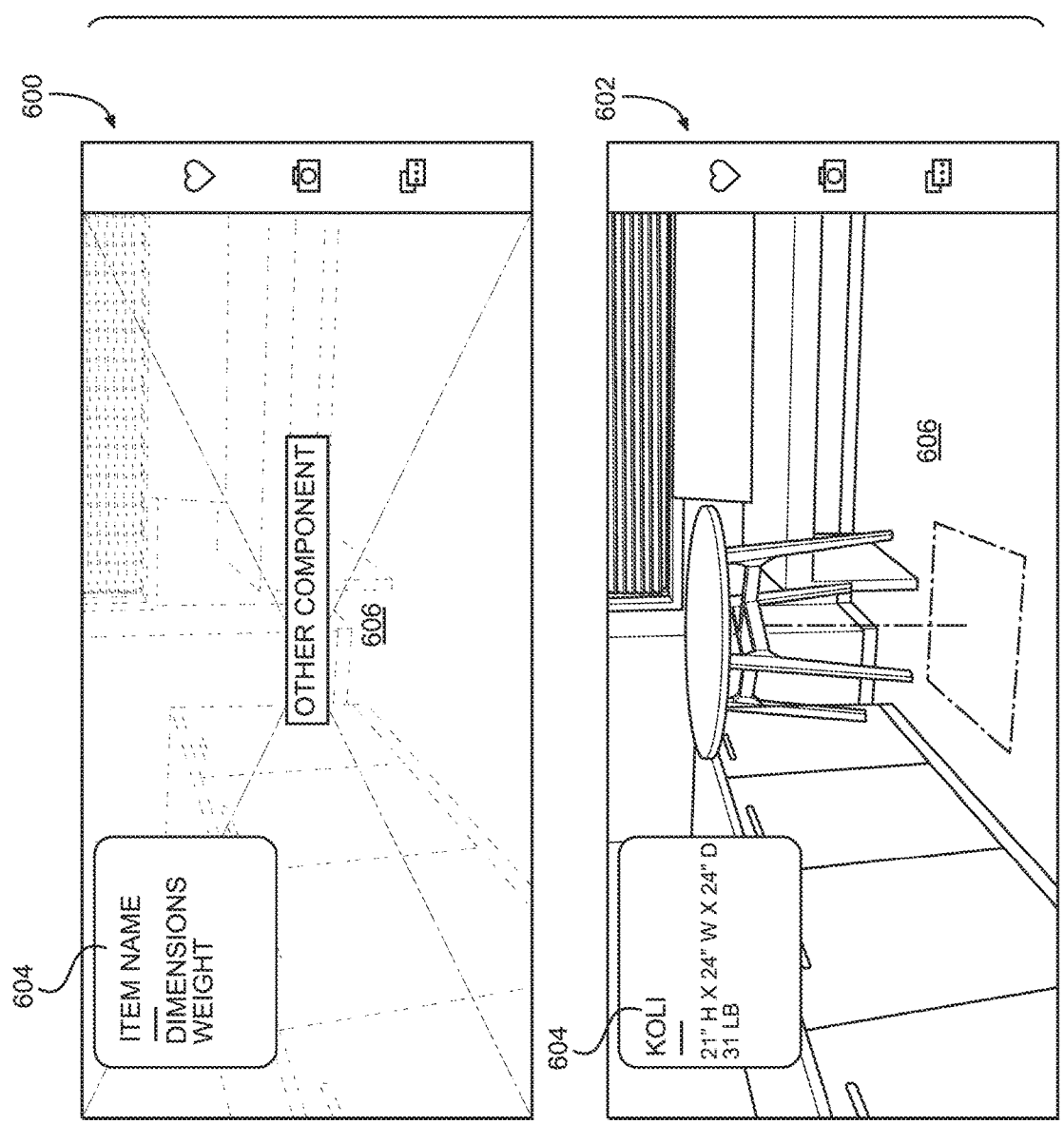
FIG. 6 illustrates generation of an example page of a multipage navigable interface in accordance with one or more embodiments.

FIG. 6 illustrates generation of an example augmented reality (AR) page of a multipage navigable interface in accordance with one or more embodiments. AR page outline 600 includes several interface elements configured to accept insertion of content for the completed AR page 602. AR page outline 600 includes an item name interface element 604 that may be manipulated to display a name of the item, dimensions for the item, and a weight of the item, in one embodiment. Other content may be included with the name of the item in the item name interface element 604, such as an item description, related items, item price, etc. AR page outline 600 also includes an item image interface element 606 for displaying an image of the item within an actual or virtual space. This image interface element 606 may be interactive to allow for movement, placement, and rotation of the product within the space in one embodiment. In another embodiment, the image interface element 606 may be static once the image is placed within the space.

AR page 602 shows the name of the item, "Koli," in the item name interface element 604 along with the dimensions and weight. The image of the "Koli" table is also shown positioned in the item image interface element 606 with a user being able to interact with the image of the table and place it as desired in the space provided in the background image. Once the AR page 602 is populated with desired content, it may be stored to a repository for use in a multipage navigable interface in an embodiment.

In an example, if a system receives the AR page 602 for inclusion in a multipage navigable interface, the system may determine identify item name interface element 604 and item image interface element 606 for displaying an image of the item within an actual or virtual space. Based on these elements, the system may determine that this page is an AR page for displaying the item in an interactive manner. Based on this determination, the system may infer a relationship from this AR page 602 to a detail page for the item. As a result, the system places a navigation interface element on the detail page that, when selected, transitions the interface from the detail page to the AR page 602 according to this determined relationship. A corresponding navigational relationship back to the detail page may be inferred by the system for the AR page 602, and a navigation interface element may be placed on the AR page 602 to transition the interface back to the detail page for the item upon selection thereof.

5.3 Relationships Between a Series of Pages of a Multipage Navigable Interface

Figure 7:
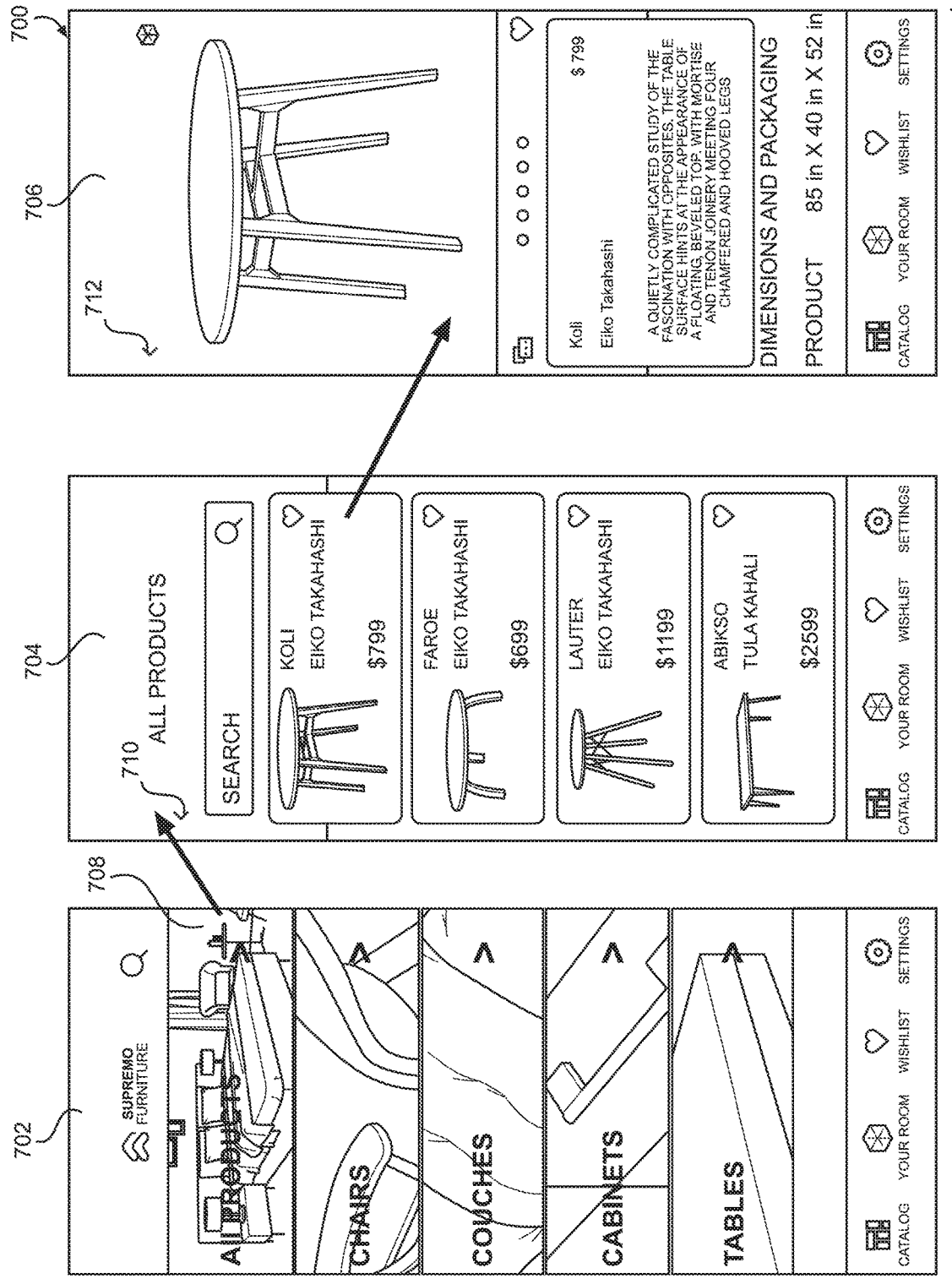
FIG. 7 illustrates a series of pages of a multipage navigable interface in accordance with one or more embodiments.

FIG. 7 illustrates a series of pages of a multipage navigable interface 700 in accordance with one or more embodiments. Catalog page 702 includes a listing of categories for browsing, with each category being indicated by a category tile. By selecting navigation interface element 708 or anywhere on the "All Products" category tile, the interface 700 transitions to a product listing page 704, which displays "All Products" as the heading, a search bar, and a set of summary panes for various products. In this example, a collection of tables is shown as part of "All Products." Upon receiving selection of navigation interface element 710, the interface 700 will return to the catalog page 702.

Upon receiving selection of the "Koli" summary pane, the interface 700 transitions to a product detail page 706 for the "Koli" table. The product detail page 706 includes an image interface element displaying an image of the "Koli" table, a navigation interface element 712 for navigating back to the product listing page 704, and a description interface element displaying a description of the "Koli" table.

FIG. 7 shows the navigational relationships between a series of different pages for the interface 700. To assemble the catalog page 702, the system identifies characteristics of a series of images and a series of text elements in headline format, each text element being associated with one of the images, designed to be reproduced behind the headline text element in a list format. Based on these characteristics, a set of content that includes the series of images and the series of text elements in headline format is determined to be a catalog page.

Also, to assemble the product listing page 704, the system identifies characteristics of a series of images, a series of related text elements in headline format being of a certain furniture type (e.g., tables), and a search bar element, to be displayed in a list format. Based on these characteristics, a set of content that includes the series of images, the series of related text elements, and the search bar element is determined to be a product listing page.

In addition, to assemble the product detail page 706, the system identifies characteristics of an image interface element displaying an image of the "Koli" table, and a description interface element displaying a description of the "Koli" table. Based on these characteristics, a set of content that includes the image of the "Koli" table and the description of the "Koli" table is determined to be a product detail page.

Moreover, the system determines that each summary tile on the catalog page 702 has a relationship with a set of content representing a product listing page for the associated product type listed on the summary tile. Also, the system determines that the product listing page 704 includes relationships to product detail pages for each product listed on the product listing page 704. Based on the system-determined relationships, the system generates navigation interface elements to navigate between the catalog page 702, the product listing page 704, and the product detail page 706.

Figure 8:
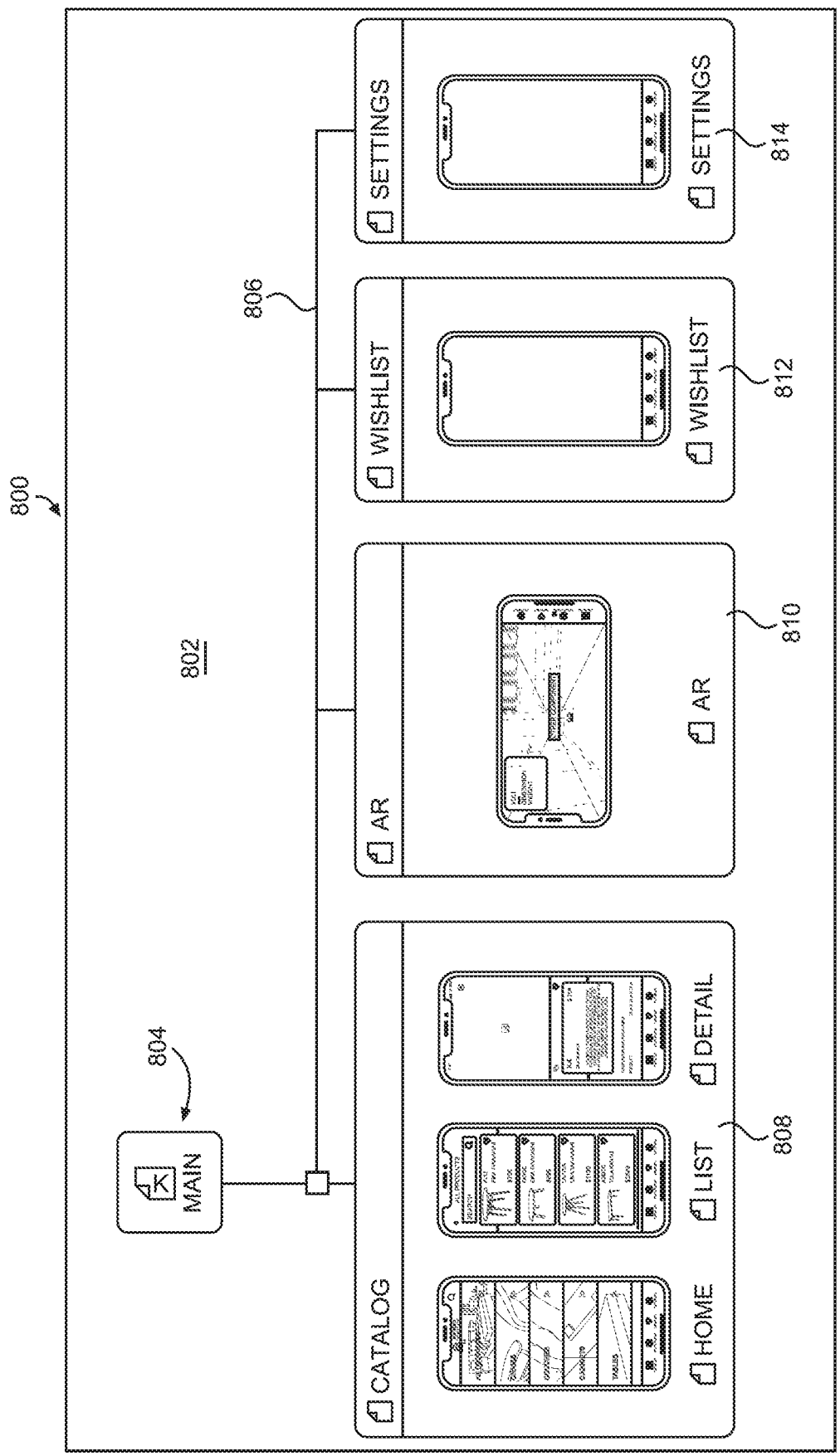
FIG. 8 illustrates an interface in accordance with one or more embodiments.

5.4 Example Interface Showing Relationships Between Pages of a Multipage Navigable Interface FIG. 8 illustrates an interface 800 in accordance with one or more embodiments. In this example, the collection is configured for presentation on a mobile phone display, with two distinct orientations: landscape and portrait. As illustrated in FIG. 8, the interface 800 includes a palette 802, on which the organization of the interface 800 is displayed. Once the navigational relationships 806 between the various sets of content are determined by the system, they may be refined and/or manipulated by a user, such as by using click and drag, end point manipulation, double clicking on target sets of content, etc.

The example pages from which the interface is generated is shown on palette 802. The pages includes a main page 804, which does not currently have a layout or content determined for the page. The pages also include a plurality of product pages 808 directed to describing products (such as products available for purchase, products manufactured by a manufacturer, products for lease by a retailer, etc.). Other pages may be included in the interface, including but not limited to, an augmented reality (AR) page 810, a wishlist page 812, a settings page 814, etc. The main page 804 has a navigational relationship 806 to each of the other pages to allow a user to navigate to each of the pages of the multipage navigable interface.

Each of the product pages 808 may include different information and/or content. The content may be directed to a single product, a group of products, or all products. In the example shown, the product pages 808 include a home page, at least one list page, and at least one detail page. The home page displays different catalog pages representing different product categories. The list page displays different products within a single category. Each detail page displays an individual product along with an image and details of the product. Other types of pages may be included in the interface in various approaches, with or without any of the product pages shown in FIG. 8.

The AR page 810 is configured to provide user interaction with one or more immersive, three-dimensional representations of actual locations with one or more products shown in the space. For example, the space may be an actual room of a prospective buyer's home, a virtual room in a home with user-selectable configurations (colors, sizes, design, etc.), an actual or virtual outdoor space, an actual or virtual showroom floor, an actual or virtual commercial space, etc. In one embodiment, the user may provide an image of a space for the background of the AR page 810, and a selected product may be displayed in the space with appropriate dimensions for the image provided. The AR page 810 may display any type of content in an interactive environment selected by a user, or automatically provided by the system in various approaches.

The wishlist page 812 may include functionality to allow a user to select products from various product pages 808 and store them to a wishlist, the entries thereof being stored in a data repository for future reference by the user. Each product added to the wishlist page 812 may be displayed in the wishlist, along with information and/or details about the product, such as availability, price, dimensions, weight, colors, configurations, options, etc. Any content may be added to a wishlist via a wishlist page 812, as the wishlist is not limited to storing products selected by a user. The wishlist page 812 may store and display any type of content that the user adds to the wishlist in various approaches.

The settings page 814 may include options for the user to customize the various pages. The product pages 808, main page 804, wishlist page 812, etc., may each be configured through the settings page 814. Some example settings include, but are not limited to, number of items per page, colors, security options, pages included in the interface, orientation of the page, type of device for display of the interface, etc.

Based on the different types of pages within the collection, which may be determined by the system based on the content and/or elements included in each page and/or specified by the user when setting up each individual page (e.g., which content/elements are included from the set of content), the navigational relationships 806 between pairs of sets of content in the collection are determined by the system.

These determined navigational relationships 806 are displayed in the palette 802 as one or more lines, in one embodiment, which connect the various related pages, such as the product pages 808 being connected to the AR page 810. This allows for an organizational structure for the collection to be determined based on the various navigational relationships 806, content type, and content layout, from one or more learned organizational structures.

In one or more embodiments, the interface 800 may include more or fewer sets of content in the collection than the sets illustrated in FIG. 8. For example, interface 800 may also include a help page, contact page, payment processing page, etc. Additional information may be included in interface 800 that is not shown in FIG. 8, and may be relied upon when determining navigational relationships 806 between sets of content in the collection.

Data and information for use by interface 800 may be received and/or obtained from multiple applications and/or devices. Multiple elements may be combined into one element for display. Operations described with respect to one element may instead be performed by another element in some approaches.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a NAT. Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 9:
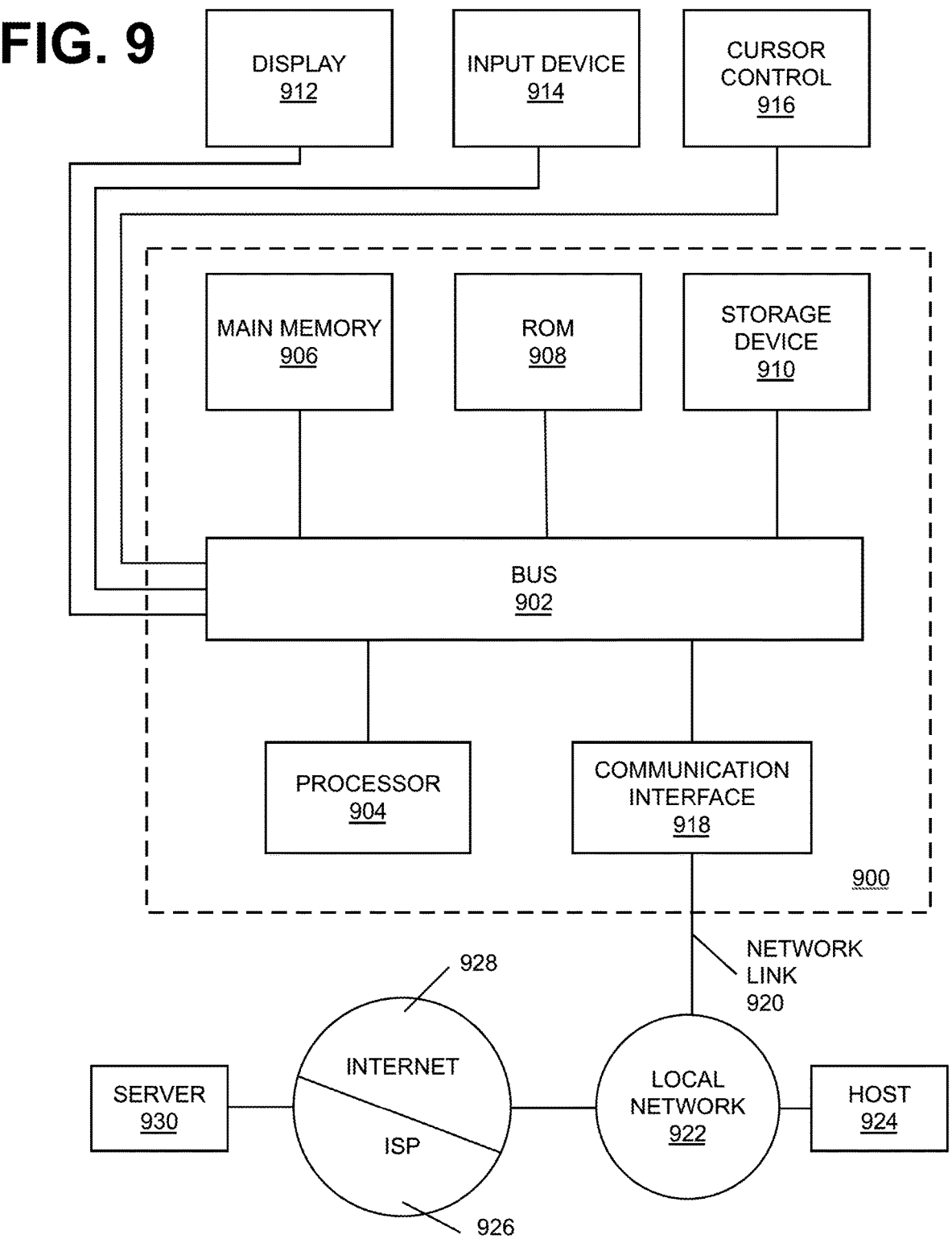
FIG. 9 shows a block diagram that illustrates a computer system in accordance with one or more embodiments.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A system comprising:
one or more hardware processors; and
a non-transitory computer readable medium comprising instructions which, when executed by the one or more hardware processors, causes performance of operations comprising:
receiving a collection comprising a plurality of sets of content;
determining a first layout for a first set of content in the collection;
determining a second layout for a second set of content in the collection;
automatically generating an organizational structure for the collection based at least on the first layout for the first set of content and the second layout for the second set of content;
based at least on the organizational structure: automatically determining a first navigational relationship from the first set of content to the second set of content in the collection; and
automatically generating a multipage navigable interface comprising:
a first page that includes the first set of content;
a second page that includes the second set of content; and a first interface element, within the first page, corresponding to the first navigational relationship that provides for navigation from the first page to the second page.

2. The system as recited in claim 1, wherein the operation for determining the organizational structure for the collection comprises operations for:
   determining a first content type for the first set of content based on the first layout and a second content type for the second set of content based on the second layout; and
   determining the organizational structure based on the first content type and the second content type.

3. The system as recited in claim 2, wherein the operation for determining the organizational structure for the collection further comprises operations for:
   determining that the first set of content is an only set of content, of the plurality of sets of content, of the first content type;
   determining that multiple sets of content, including the second set of content, of the plurality of sets of content, are of the second content type; and
   generating a hierarchical structure comprising:
      a first node representing the first set of content; and
      multiple nodes respectively representing the multiple sets of content,
      wherein the first node is a parent node of each of the multiple nodes.

4. The system as recited in claim 3, wherein the operation for generating the hierarchical structure further comprises an operation for:
   determining that the first node is linked to the multiple nodes in accordance with multiple first navigational relationships, and
   wherein the first page comprises multiple interface elements, including the first interface element, corresponding respectively to the multiple first navigational relationships that provide for navigation from the first page to pages for the multiple nodes.

5. The system as recited in claim 2, wherein the operation for determining the first content type for the first set of content further comprises an operation for computing a similarity score based on a comparison of content characteristics, including the first layout, of the first set of content with a standard set of characteristics for the first content type.

6. The system as recited in claim 2, wherein the first content type and the second content type are selected from a group of content types consisting of: webpages, images, videos, help pages, index pages, root sites, main entry sites, database sheets, catalog pages, product description pages, event description pages, and word-processing documents.

7. The system as recited in claim 1, wherein the operation for generating the multipage navigable interface further comprises an operation for generating a third page that includes a third set of content of the plurality of sets of content, wherein the first page comprises a second interface element corresponding to a second navigational relationship that allows for navigation from the first page to the third page.

8. The system as recited in claim 1, wherein the operations further comprise receiving content metadata corresponding to the collection, the content metadata describing content characteristics of the first set of content and the second set of content, and wherein the content metadata is selected from a group comprising: a number of images within a corresponding set of content, a size of text within the corresponding set of content, whether the corresponding set of content is related to payment processing, a number of fields within the corresponding set of content, and a type of the fields within the corresponding set of content.

9. The system as recited in claim 1, wherein the operations further comprise determining a device type for display of the multipage navigable interface based at least on the first layout for the first set of content and the second layout for the second set of content, wherein configuring the multipage navigable interface comprises choosing a format for presentation based on one or more display characteristics of the device type, and wherein the multipage navigable interface is configured for operation on the determined device type.

10. The system as recited in claim 1,
   wherein the operation for determining the organizational structure for the collection comprises operations for:
      determining a first content type for the first set of content based on the first layout by computing a first similarity score based on a comparison of first content characteristics, including the first layout, of the first set of content with a standard set of characteristics for the first content type; and
      determining a second content type for the second set of content based on the second layout by computing a second similarity score based on a comparison of second content characteristics, including the second layout, of the second set of content with a standard set of characteristics for the second content type;
      determining that the first set of content is an only set of content, of the plurality of sets of content, of the first content type;
      determining that multiple sets of content, including the second set of content, of the plurality of sets of content, are of the second content type;
      generating a hierarchical structure comprising:
         a first node representing the first set of content; and
         multiple nodes respectively representing the multiple sets of content, wherein the first node is a parent node of each of the multiple nodes; and
      determining that the first node is linked to the multiple nodes in accordance with multiple first navigational relationships,
   wherein the first page comprises multiple interface elements, including the first interface element, corresponding respectively to the multiple first navigational relationships that provide for navigation from the first page to pages for the multiple nodes.

11. The system as recited in claim 1, wherein determining the first layout for the first set of content comprises:
   identifying a plurality of layout elements corresponding respectively to a plurality of content items in the first set of content; and
   determining the first layout for the first set of content based at least on the plurality of layout elements.

12. The system as recited in claim 11, wherein the plurality of layout elements comprise two or more of: a list, a title, a description section, a sidebar, a pull-down menu, a pop-up notification, a headline, an embedded media element, a search bar, a table, and a spreadsheet.

13. A non-transitory computer readable medium comprising instructions which, when executed by the one or more hardware processors, causes performance of operations comprising:
   receiving a collection comprising a plurality of sets of content;
   determining a first layout for a first set of content in the collection;

determining a second layout for a second set of content in the collection;

automatically determining an organizational structure for the collection based at least on the first layout for the first set of content and the second layout for the second set of content;

based at least on the organizational structure: automatically determining a first navigational relationship from the first set of content to the second set of content in the collection; and automatically generating a multipage navigable interface comprising:

a first page that includes the first set of content;

a second page that includes the second set of content; and a first interface element, within the first page, corresponding to the first navigational relationship that provides for navigation from the first page to the second page.

14. The non-transitory computer readable medium as recited in claim 13, wherein the operation for determining the organizational structure for the collection comprises operations for:

determining a first content type for the first set of content based on the first layout and a second content type for the second set of content based on the second layout; and determining the organizational structure based on the first content type and the second content type.

15. The non-transitory computer readable medium as recited in claim 14, wherein the operation for determining the organizational structure for the collection further comprises operations for:

determining that the first set of content is an only set of content, of the plurality of sets of content, of the first content type;

determining that multiple sets of content, including the second set of content, of the plurality of sets of content, are of the second content type; and generating a hierarchical structure comprising:

a first node representing the first set of content; and multiple nodes respectively representing the multiple sets of content, wherein the first node is a parent node of each of the multiple nodes.

16. The non-transitory computer readable medium as recited in claim 15, wherein the operation for generating the hierarchical structure further comprises an operation for:

determining that the first node is linked to the multiple nodes in accordance with multiple first navigational relationships, and wherein the first page comprises multiple interface elements, including the first interface element, corresponding respectively to the multiple first navigational relationships that provide for navigation from the first page to pages for the multiple nodes.

17. The non-transitory computer readable medium as recited in claim 14, wherein the operation for determining the first content type for the first set of content further comprises an operation for computing a similarity score based on a comparison of content characteristics, including the first layout, of the first set of content with a standard set of characteristics for the first content type.

18. The non-transitory computer readable medium as recited in claim 14, wherein the first content type and the second content type are selected from a group of content types consisting of: webpages, images, videos, help pages, index pages, root sites, main entry sites, database sheets, catalog pages, product description pages, event description pages, and word-processing documents.

19. The non-transitory computer readable medium as recited in claim 13, wherein the operation for generating the multipage navigable interface further comprises an operation for generating a third page that includes a third set of content of the plurality of sets of content, wherein the first page comprises a second interface element corresponding to a second navigational relationship that allows for navigation from the first page to the third page.

20. The non-transitory computer readable medium as recited in claim 13, wherein the operations further comprise receiving content metadata corresponding to the collection, the content metadata describing content characteristics of the first set of content and the second set of content, and wherein the content metadata is selected from a group comprising: a number of images within a corresponding set of content, a size of text within the corresponding set of content, whether the corresponding set of content is related to payment processing, a number of fields within the corresponding set of content, and a type of the fields within the corresponding set of content.

21. The non-transitory computer readable medium as recited in claim 13, wherein the operations further comprise determining a device type for display of the multipage navigable interface based at least on the first layout for the first set of content and the second layout for the second set of content, wherein configuring the multipage navigable interface comprises choosing a format for presentation based on one or more display characteristics of the device type, and wherein the multipage navigable interface is configured for operation on the determined device type.

22. A method comprising:

receiving a collection comprising a plurality of sets of content;

determining a first layout for a first set of content in the collection;

determining a second layout for a second set of content in the collection;

automatically determining an organizational structure for the collection based at least on the first layout for the first set of content and the second layout for the second set of content;

based at least on the organizational structure: automatically determining a first navigational relationship from the first set of content to the second set of content in the collection; and automatically generating a multipage navigable interface comprising:

a first page that includes the first set of content;

a second page that includes the second set of content; and a first interface element, within the first page, corresponding to the first navigational relationship that provides for navigation from the first page to the second page, wherein the method is performed by at least one device including a hardware processor.

* * * * *